United States Patent [19]
Petit

[11] Patent Number: 5,966,419
[45] Date of Patent: *Oct. 12, 1999

[54] SPACING GRID OF A FUEL ASSEMBLY FOR A NUCLEAR REACTOR AND FUEL ASSEMBLY

[75] Inventor: Bernard Petit, Brignais, France

[73] Assignee: Cogema, Velizy-Villacoublay, France

[*] Notice: This patent is subject to a terminal disclaimer.

[21] Appl. No.: 08/973,199

[22] PCT Filed: Jun. 24, 1996

[86] PCT No.: PCT/FR96/00989

§ 371 Date: Dec. 3, 1997

§ 102(e) Date: Dec. 3, 1997

[87] PCT Pub. No.: WO97/01849

PCT Pub. Date: Jan. 16, 1997

[30] Foreign Application Priority Data

Jun. 29, 1995 [FR] France .................................. 95 07857

[51] Int. Cl.⁶ .................................................. G21C 3/356
[52] U.S. Cl. .............................................................. 376/441
[58] Field of Search .................................... 376/441, 442, 376/462

[56] References Cited

U.S. PATENT DOCUMENTS

| 3,762,996 | 10/1973 | Milburn et al. | 376/442 |
|---|---|---|---|
| 4,411,862 | 10/1983 | Leclercq et al. | 376/441 |
| 4,474,730 | 10/1984 | Hellman et al. | 376/441 |
| 4,879,090 | 11/1989 | Perrotti et al. | 376/442 |
| 5,114,668 | 5/1992 | Oyama et al. | 376/442 |
| 5,732,116 | 3/1998 | Petit | 376/441 |

FOREIGN PATENT DOCUMENTS

| 0 025 393 | 3/1981 | European Pat. Off. . |
|---|---|---|
| 0 027 203 | 4/1981 | European Pat. Off. . |
| 0 033 263 | 8/1981 | European Pat. Off. . |
| 0 088 021 | 9/1983 | European Pat. Off. . |
| 0 468 871 | 1/1992 | European Pat. Off. . |
| 2 168 059 | 4/1973 | France . |
| WO-A-92/ 05566 | 4/1992 | Germany . |

OTHER PUBLICATIONS

Patent Abstracts of Japan, vol. 014, No. 581 (P–1147), Dec. 26, 1990 and JP–A–02 251789 (Nuclear Fuel Ind. Ltd.) Oct. 9, 1990.

*Primary Examiner*—Daniel D. Wasil
*Attorney, Agent, or Firm*—Pollock, Vande Sande & Amernick

[57] ABSTRACT

The spacer grids consist of interlaced metal straps defining a regular lattice of cells. A spring for holding a fuel rod against bearing stops is fixed on at least one wall of each of the cells. In its part which constitutes the wall of the cell, the strap includes at least one stop produced by cutting and pushing the metal of the strap into the cell, so as to limit the displacement of a fuel rod housed in the cell. Stops for limiting the displacement of the fuel rod are placed preferably o the walls of the peripheral cells or corner cells of the spacer grid, opposite a peripheral belt of the spacer grid. The invention also relates to a fuel assembly which includes, in addition to structural spacer grids, end grids and additional mixing grids interposed between the structural spacer grids.

30 Claims, 10 Drawing Sheets

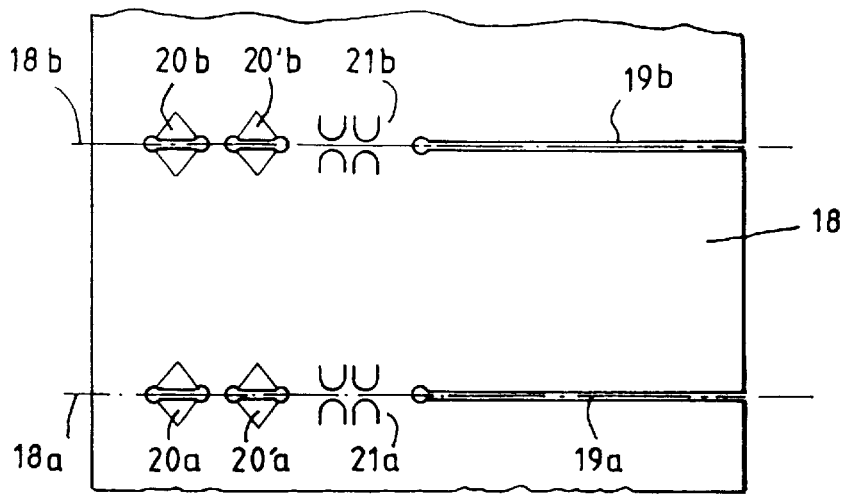
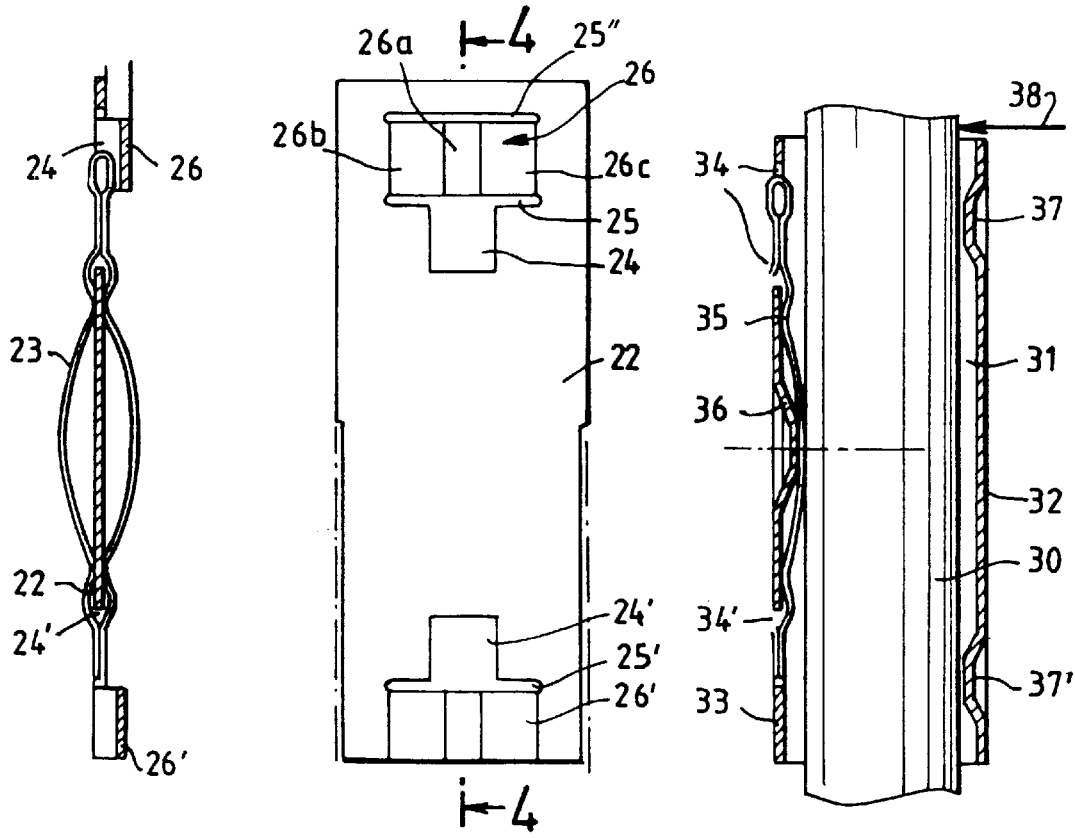

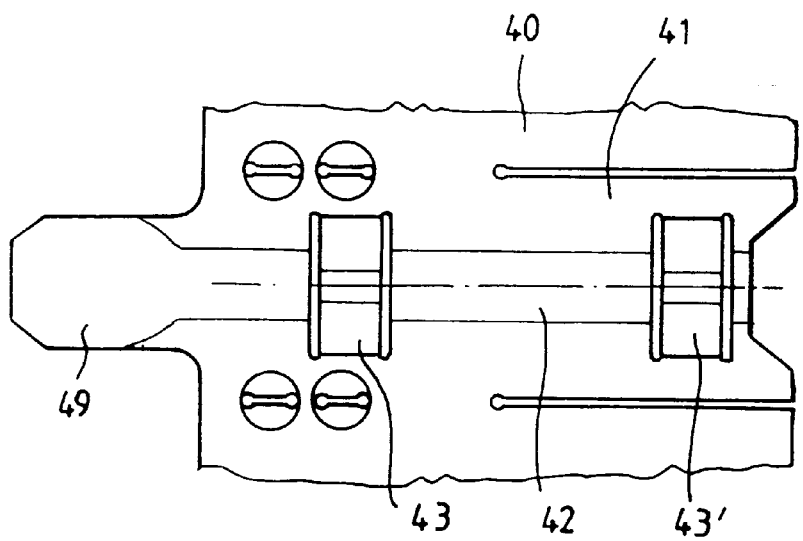
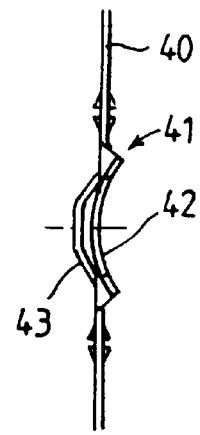
FIG.9          FIG.10
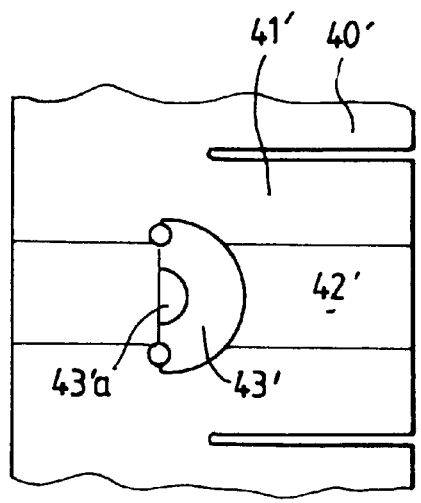
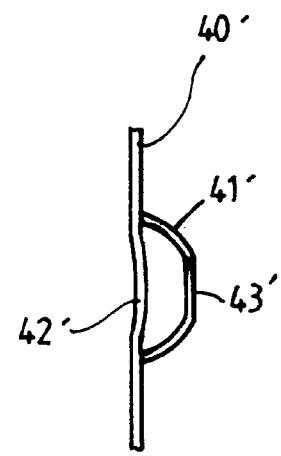
FIG.11         FIG.12

SPACING GRID OF A FUEL ASSEMBLY FOR A NUCLEAR REACTOR AND FUEL ASSEMBLY

FIELD OF THE INVENTION

The invention relates to a fuel assembly for a nuclear reactor, the framework of which includes structural spacer grids and additional grids for mixing reactor coolant, which consists of interlaced metal straps defining cells which are preferably arranged in a lattice with square repeat units.

The fuel assemblies of nuclear reactors, in particular of light water nuclear reactors, generally consist of a bundle of fuel rods, i.e., tubes made of a material which is a weak neutron absorber, filled with pellets of fissile material. The fuel rod bundle constituting a fuel assembly is held by a rigid framework including spacer grids spaced along the length of the bundle, longitudinal guide tubes introduced and fixed inside some cells of the spacer grids, and end nozzles which close the framework and hold the rods at each of the ends of the fuel assembly. The structural spacer grids, which consist of interlaced straps defining cells arranged in a lattice generally having square repeat units, transversely hold the fuel rods in the bundle, the fuel rods passing through the interior of the cells of the grids. In this way, the rods have a regular arrangement in the transverse directions, which is set by the grids. Some of the cells are occupied by guide tubes which are connected at their ends to the closure nozzles of the assembly. Each cell of a spacer grid receives either a fuel rod or a guide tube.

In order to hold the fuel rods transversely and/or axially inside the cells of the spacer grids, it is necessary to exert transverse forces on these rods, and for this purpose to provide holding devices, supported by the walls of the cells of the grid and extending into the cell.

Each of the cells has a size such that a large clearance is provided between the rod and the walls of the cell. This clearance is necessary to allow flow of the coolant and to facilitate mounting of the rods in the assembly.

The devices for holding the rods inside the cells of the grid should hold the rods in the cells to an extent which is sufficient to avoid excessively large displacements and deformations of the rods, as well as exaggerated flexing under the effect of the deformations caused by heat and irradiation.

It is furthermore necessary to avoid exerting excessively large clamping forces on the tubular cladding of the rod, risking causing the cladding to flex. It is also necessary to avoid a fastening method which risks giving rise to exaggerated wear of the cladding of the rod.

BACKGROUND OF THE INVENTION

Devices for holding the fuel rods in the cells of spacer grids have therefore been proposed which provide an exceptional compromise between these seemingly contradictory requirements. For making the structural grids and the elements for holding the fuel rods, it is furthermore necessary to use materials which have satisfactory mechanical properties at the operating temperature of the nuclear reactor and have sufficient stability under the conditions prevailing in the nuclear reactor core, in the presence of the cooling fluid of the reactor and the irradiation.

It has, for example, been proposed to make the spacer grids of an alloy with high yield strength, such as a nickel alloy, springs and rigid stops for holding the rods being obtained by cutting and pushing in some portions of the straps constituting the grid. Such a solution has the drawback of introducing a relatively large volume of neutron-absorbing material into the assembly.

It has also been proposed to make the straps constituting the cells of the grid from a material which is a weak neutron absorber, such as a zirconium alloy, the elements for holding the fuel rods being attached to these zirconium alloy straps. The holding elements may consist of attached springs made of a highly elastic alloy and of rigid stops formed on the straps constituting the various walls of the cells of the grid, in such a way that in each cell the springs are on walls opposite the walls on which the rigid stops are formed. The springs may consist, for example, of a leaf of elastic material, at least partially enclosing the strap and closed on itself.

FR-A-2,474,229 has proposed the use of double springs, i.e., springs including two active parts which are intended to come into contact with a fuel rod, in two cells located on either side of the strap on to which the spring is fixed, on the majority of the walls equipped with springs, and single springs including a single active part on the other walls equipped with springs.

The spacer grids consist of interlaced zirconium alloy straps defining the regular lattice of cells into which the fuel rods are introduced. The cells defined by the straps are of generally parallelepipedal shape with square cross-section and have mutually parallel corner edges, each consisting of the intersection of two straps forming a cross-brace consisting of four dihedra, the angle of which is generally 90°, having in common one corner edge common to four cells of the grid.

In some types of fuel assembly, the spacer grids are all identical and consist of interlaced zirconium alloy straps which are assembled with each other, on to which springs are attached.

Fuel assemblies which include a plurality of types of spacer grids having different functions are also known.

In particular, a fuel assembly is known which includes at each of its ends a rod-holding grid made entirely of martensitic steel, intermediate grids, between the end grids, constituting structural grids which include interlaced zirconium alloy straps and attached springs and, interposed between the structural grids, in the upper part of the fuel assembly, grids for mixing the cooling fluid of the nuclear reactor.

In the case of fuel assemblies in which all the grids are zirconium alloy structural grids including attached springs, the springs are the only holding elements which are interposed, in each of the cells, between the rod housed in the cell and that wall of the grid on to which the spring is fixed. If the fuel rod is subjected to a stress tending to displace it towards a cell wall on which a spring is mounted, the spring can be formed by compression so that the rod moves inside the cell in a transverse direction.

In the case of holding grids which are different from the structural grids, the springs bear on the rods and also risk being deformed by external forces exerted on the fuel assembly.

In the case of the peripheral cells of the grid and, in particular, in the case of the corner cells of the grid, the fuel rods may undergo large displacements due, for example, to an impact or the fuel assembly catching on a second fuel assembly or on an obstacle, during handling of the assembly.

This may result in damage to the spacer grid of the assembly and risks of the grids of the assemblies catching when they are handled.

In the case of the internal cells of a structural grid, the springs attached to the walls of the cell may also be subjected to large forces during the handling of the fuel assembly or during operation of the nuclear reactor.

WO-A-9205566 and FR-A2,168,059 describe a spacer grid for a fuel assembly of a nuclear reactor cooled by boiling water, consisting of tubular walls rigidly assembled together in juxtaposed positions. Fuel-rod holding springs are placed so as to surround opposite parts of two adjacent walls. The opposite parts of the adjacent walls are pushed in so as to form dimples, in the shape of a spherical cap, facing the branches of the spring.

In a fuel assembly for a boiling water reactor which includes such grids having juxtaposed tubular walls, the mechanical behavior of the fuel rods and the springs supported by the walls is essentially different from the mechanical behavior of the rods in a fuel assembly for a nuclear reactor cooled by pressurized water, in which the grids consist of plane straps.

The solutions proposed for the problems of spring deformation and rod displacement cannot therefore be adapted from the case of fuel assemblies for a boiling water reactor to the case of pressurized water reactors.

In the case of the structural grids, the straps, generally made of zirconium alloy, are engaged in pairs at their intersections, by means of an assembly slot; these plates must furthermore be welded in order to make the spacer grid sufficiently rigid and solid.

Because the straps are thin, some precautions must be taken during welding in order to avoid deforming or oxidizing them. Efforts are therefore made to limit the heating of the straps during the welding and to distribute as much as possible the thermal stresses due to the welding of the grid.

For example, EP-A-0,088,021 proposes laser welding of the straps. Each of the cross-braces consisting of the intersection of two straps is welded in two opposite dihedral corners of the cross-brace and only in these two corners. The cross-braces are welded successively, in a defined sequence, by moving the assembled grid, which is held by a mounting frame, under a welding installation.

The drawback of such a fastening method is that the straps are assembled at each of the cross-braces only by a welding line generally lying in a bisector plane of two opposite dihedra. This may result in a lack of rigidity and slight defects in the positioning of the straps relative to each other.

Spacer grids with attached springs may also include other defects inherent in the construction and the design of the spacer grid, when mounting the springs, when producing the bearing dimples for the fuel rods, when mounting the guide tubes or else when making the mixing or guide vanes by cutting the edges of the straps or the belt surrounding the spacer grid.

SUMMARY OF THE INVENTION

It is an object of the invention to provide a spacer grid of a fuel assembly for a nuclear reactor, consisting of interlaced metal straps defining a regular lattice of prismatically shaped cells, a part of which includes, in each cell, at least one spring for holding a fuel rod intended to be housed in the cell, the spring being arranged on a cell wall consisting of a part of a metal strap and having an active part projecting into the cell relative to the wall, this spacer grid making it possible to avoid large displacements of the fuel rods on which the springs bear, if these rods are accidentally subjected to large forces.

To this end, for at least some of the cells of the spacer grid, at least one wall on which a spring is fixed includes at least one stop projecting into the cell so as to limit the displacement of the fuel rod housed in the cell.

Preferably, the stop has a substantially plane part parallel to that wall of the cell on which the spring is fixed. The stop may advantageously be obtained by cutting and pushing in the wall of the cell.

Preferably, in the case of a spacer grid of polygonal shape having corner cells arranged in each of the corners of the grid including two successive walls consisting of angularly arranged parts of a peripheral belt of the grid, and two walls opposite the peripheral belt, each bearing a spring, each of the walls located opposite the belt includes at least one stop projecting into the cell. The cells of the grid which include spring stops may be limited to the corner cells.

Preferably, the set of peripheral cells of the spacer grid, which each include at least one outer wall consisting of a part of a peripheral belt of the grid and an inner wall opposite the belt, is produced in such a way that each of the walls placed opposite the belt includes at least one stop produced by cutting and pushing the wall into the cell. In this case, the presence of stops which reduce the amplitude of displacement of the fuel rods and the compressive deformation of the springs may be limited to the peripheral cells.

Preferably, the spacer grid according to the invention, in which the mutually parallel corner edges of the cells each consist of the intersection of two straps forming a cross-brace consisting of four dihedra having in common one corner edge common to four cells, is characterized in that the straps are welded together in pairs at each of the corner edges along a first bisector plane of two opposite dihedra, in a first end region of the corner edge, and along a second bisector plane of the other two opposite dihedra, in a second end region, opposite the first, of the corner edge of the cross-brace.

Preferably each of the straps also includes, level with each of the corner edges of the cross-braces, holding tongues making it possible to rigidify its assembly with a second strap, level with the cross-brace. The cells receiving guide tubes include bushed parts, in the shape of cylinder portions, intended to house and possibly fasten the guide tube. The vanes for mixing the cooling fluid of the fuel assembly and the dimples for retention of the rods are produced in such a way that the vanes do not extend over the space occupied by the dimples. Finally, the guide vanes located on the peripheral belt of the spacer grid may be fixed by welding onto a projecting part cut from a strap of the spacer grid.

BRIEF DESCRIPTION OF THE DRAWINGS

In order to explain the invention clearly, a description will now be given, by way of example and with reference to the appended drawing figures, of an spacer grid of a fuel assembly and of a fuel assembly according to the invention.

FIG. 3 is an elevation view of a wall of a peripheral cell of the spacer grid represented in FIG. 2.

FIG. 4 is a view in section along 4—4 of the wall represented in FIG. 3, on which a spring is mounted.

FIG. 5 is a view in section and in elevation of a peripheral cell of a spacer grid according to an alternative embodiment of the invention.

FIG. 8 is a plan view of a part of a strap of a spacer grid according to the invention, including fastening tongues along two corner edges of a cell.

FIG. 9 is a plan view of a part of a strap constituting the wall of a cell for fastening a guide tube.

FIG. 10 is a cross-sectional view of FIG. 8.

FIG. 11 is a plan view of a part of a strap constituting the wall of a cell for fastening a guide tube, produced according to a variant of FIG. 9.

FIG. 12 is a cross-sectional view of FIG. 11.

DESCRIPTION OF PREFERRED EMBODIMENT

Figure 1:
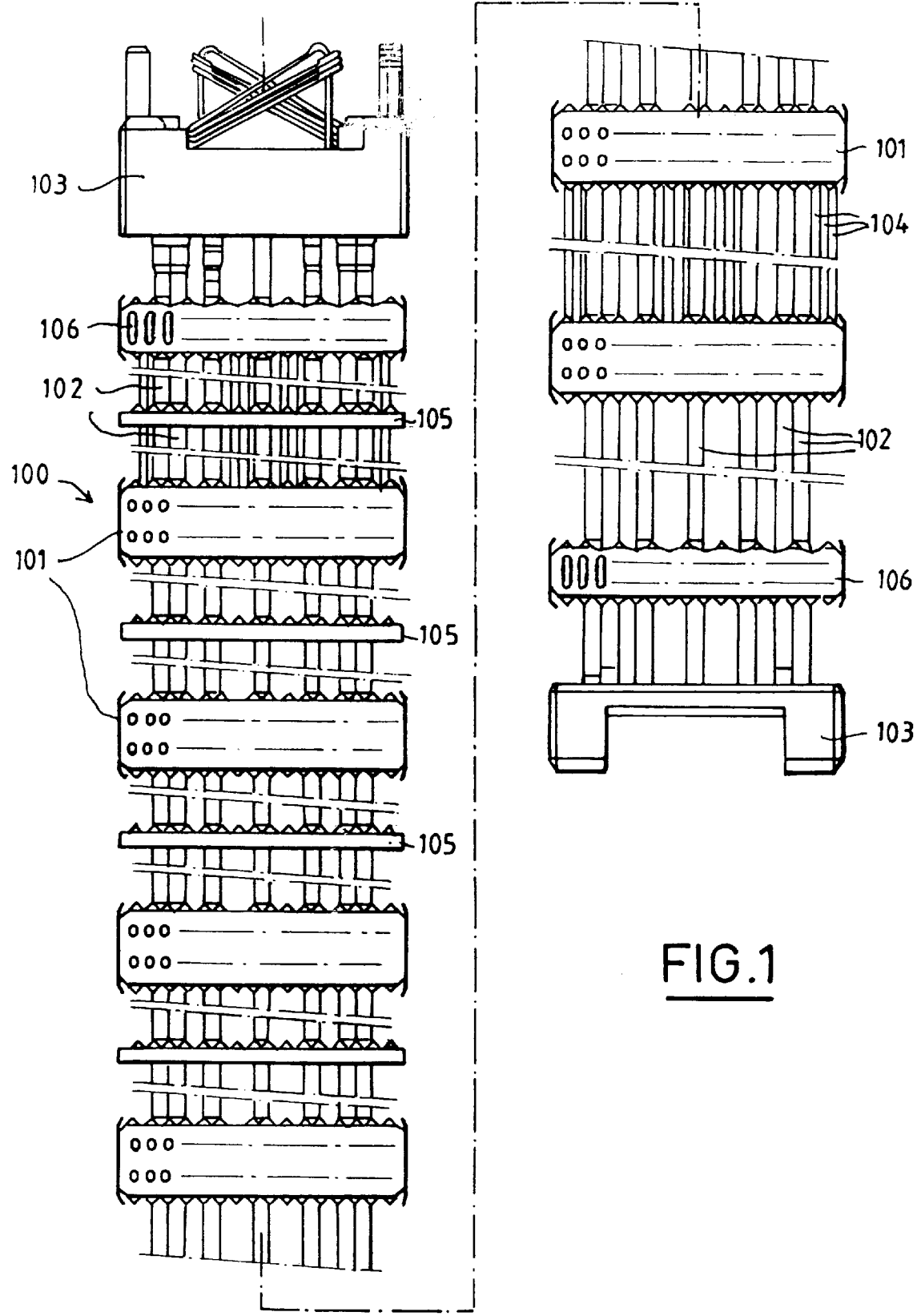
FIG. 1 is a side elevation view of a fuel assembly of a nuclear reactor cooled by pressurized water, including spacer grids according to the invention.

FIG. 1 shows a fuel assembly 100 of a pressurized water nuclear reactor, including a framework consisting of guide tubes 102, structural spacer grids 101 spaced regularly along the length of the guide tubes, an end grid 106 at each of the ends of the guide tubes, and additional mixing grids 105, each interposed between two structural grids 101 in the upper part of the fuel assembly. The ends of the guide tubes 102 are fixed on to the end nozzles 103 which close the ends of the fuel assembly. The fuel rods 104, which are shorter than the guide tubes 102, are introduced into the framework in such a way as to bear against the spacer grids. The spacer grids include cells arranged in a regular lattice, into each of which a fuel rod 104 or a guide tube 102 is introduced.

The end grids 106 of the framework of the fuel assembly are made entirely of martensitic steel with low susceptibility to relaxation under irradiation, and include dimples and springs which are formed in the straps constituting the martensitic steel grid. The springs exert forces on the fuel rods, allowing the latter to be held in the transverse and axial directions inside the framework.

The guide tubes 102 are fixed on to the lower end grid 106.

The upper end grid 106 may optionally be mounted so as to slide on the guide tubes 102.

The structural spacer grids 101 distributed over the length of the fuel assembly, between the end grids 106, consist of interlaced zirconium alloy straps which are welded together, on to which fuel-rod holding springs, generally made of nickel alloy, are attached.

Dimples are also formed on the straps by cutting and pushing in the metal of the straps. Inside each of the cells of the grid, generally of square cross-section, each of the fuel rods 104 bears on two sets of two dimples arranged opposite an attached spring.

The structural grids, the springs of which exert a moderate pressure against the rods of the fuel assembly, principally hold the rods in transverse directions, so that the rods constitute a regular lattice defined by the lattice of the cells of the spacer grids. The springs of the structural grids 101 do not hold the rods in the axial direction, this holding being provided only by the end grids.

The stirring grids 105 interposed between the structural grids 101 arranged in the upper part of the fuel assembly and between the upper structural grid 101 and the upper end grid 106 only include stops for limiting the displacement of the rods in the transverse directions.

The attached springs in the structural grids, which exert only moderate forces against the fuel rods, allow the rods to be positioned in the framework of the fuel assembly by sliding the rods longitudinally. These springs, which exert only moderate forces on the rods, have only a weak resistance to compression, in the event that the rods are subjected to transverse external forces.

In particular in the case of the rods arranged outside the bundle and held inside the peripheral cells of the spacer grids of the assembly, forces may be exerted on these peripheral rods when the fuel assembly is being handled. In this case, the peripheral rods may be displaced inside the cells while compressing the holding springs, so that the grids of the fuel assemblies may catch on one another via their belt, and some constituent elements of the fuel assembly may be damaged.

In particular, the rods held in the corner cells of the spacer grids of the assembly may be subjected to forces while the fuel assembly is being handled, because they are placed along the longitudinal corner edges of the fuel rod bundle.

In general, the rods received inside the internal cells of the spacer grids of the structure may vibrate and be displaced, inside the fuel assembly, when the cooling fluid of the nuclear reactor, which flows at high speed through the core, passes through this assembly.

Figure 2:
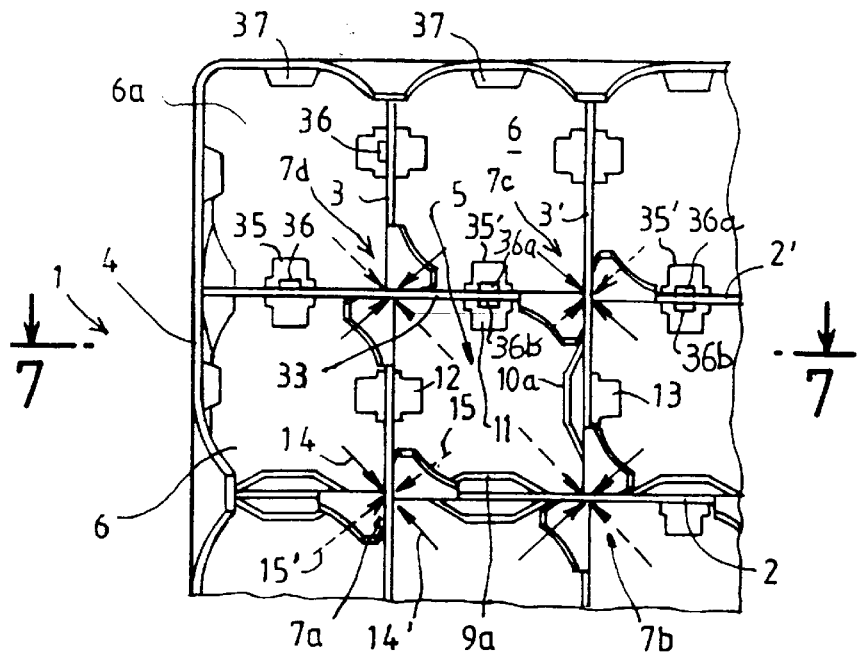
FIG. 2 is a top view of a part of a spacer grid according to the invention, showing in particular the arrangement of the springs and spring stops in the cells of the grid, as well as the welding of the straps.

FIG. 2 represents, in plan view, a part of a structural spacer grid 1 according to the invention, in the vicinity of a corner of the generally square grid.

The structural spacer grid 1 according to the invention consists of interlaced zirconium alloy straps 2, 2', 3, 3' fixed on to one another along a corner edge common to four cells of the grid.

The spacer grid 1 consists of interlaced metal straps 2, 2', 3, 3' arranged along two directions at 90° to one another, so as to define a cell lattice with square repeat units.

The part of the spacer grid represented in FIG. 2, located in the vicinity of a corner of the spacer grid, includes an outer strap 4 constituting a part of the outer belt of the spacer grid 1, which has a square cross-section. The outer belt 4 of the grid defines, with the internal straps 2, 2', 3, 3' of the grid which are arranged interlaced, peripheral cells 6 which each include a wall consisting of a part of the outer belt.

The corner cell 6a represented in FIG. 2 is bounded on two of its faces by the outer belt 4.

Each of the cells, such as 6 or 6a, of the spacer grid is intended to receive a fuel rod, the diameter of which is substantially less than the side length of a cell, or a guide tube, the diameter of which is slightly less than the side length of a cell of the spacer grid.

Inside a cell such as the cell 5, a fuel rod is held by four dimples, such as 9a, 9b and 10a, 10b (see FIGS. 2 and 7), and by two springs, such as 11 and 12, projecting into the cell 5. The spring 11 projecting into the cell 5 lies opposite the dimples 9a and 9b, and the spring 12 is opposite two dimples such as 10a and 10b.

The dimples, such as 9a, 9b and 10a, 10b, are produced by cutting and pushing in the metal of the straps such as 2 and 3', and the springs, such as 11 and 12, are attached and fixed on to the straps such as 2' and 3.

The springs 11 and 12 are double springs, i.e., springs which include two curved or flat active parts arranged in two adjacent cells, such as the cells 5 and 6 as regards the spring 12. As can be seen in FIG. 3, each of the springs, such as the spring 12, consists of a flexible leaf, for example made of a nickel alloy such as an Inconel, folded into a hairpin shape and including two curved parts projecting in the adjacent cells such as 5 and 6, these parts being intended to come into contact with a fuel rod in order to cause it to bear against a set of dimples arranged opposite the active part of the spring.

As will be explained hereinbelow, the springs such as 11 and 12 are introduced into two openings passing through a strap, such as the strap 3 or the strap 2', so as to overlap the strap over a part of its length. The springs are generally placed around the strap and fixed by spot welds joining their two branches, on either side of the strap.

Single springs, such as the spring 13, are arranged inside some cells, and these springs include only one curved active part inside a single cell. The single springs and the way in which they are fastened will be described hereinbelow.

When the fuel rods of the assembly are subjected to transverse external forces, the springs for holding these rods can be deformed by compression, so that the rod moves inside the cell. In particular, the fuel rods arranged inside the peripheral cells 6 of the spacer grids may be subjected to large external forces in the event of impact or catching when a fuel assembly is being handled. These risks are even more pronounced in the case of the rods located in the corner cells of the spacer grids, such as the cell 6a represented in FIG. 2.

One of the objects of the invention is to provide means for retaining the rods and, in particular, the peripheral rods and the rods located in the corners of the fuel assembly, which make it possible to avoid damage or catching of the fuel assembly.

FIG. 3 represents a part of a spacer grid strap 22 arranged opposite the belt of the spacer grid and constituting a wall of a peripheral cell, such as the cell 6 represented in FIG. 2.

The strap 22 constitutes a cell wall opposite the belt of the spacer grid.

FIG. 4 represents the wall 22 of the cell after mounting of a double spring 23 which holds a fuel rod in the peripheral cell of the grid. The strap 22 constituting a cell wall opposite the belt is penetrated by two openings, 24 in the upper part of the strap, and 24' in the lower part, making it possible to introduce and mount the double spring 23.

The strap 22 is furthermore penetrated by a longitudinal slot 25, in extension of the opening 24, and by a longitudinal slot 25' in extension of the opening 24'. Furthermore, a second slot 25", parallel to the slot 25, passes through the upper part of strap 22. As can be seen in FIGS. 3 and 4, a first stop 26 is produced by pushing in the metal of the strap 22 between the slots 25 and 25", and a second stop 26' is produced by pushing in the metal between the slot 25' and the lower edge of the strap 22.

The metal of the strap is pushed in and folded, in order to form the stops, in such a way that the stop has a central part, such as 26a, which is substantially parallel to the plane of the strap 22, and two lateral parts, such as 26b and 26c, which are inclined relative to the plane of the strap 22.

The stops 26 and 26' are produced in the same way, the central part, such as 26a, constituting the bearing part of the stop, being at a distance from the plane of the strap 22 which is less than the deflection of the curved active part of the spring 23.

In this way, in the event of impact or catching of a fuel assembly when it is being handled, leading to a thrust on the rod located in the peripheral cell and held by the spring 23, the displacement of the rod and the deformation of the spring are limited as a result of the fact that the rod comes to bear on the stops 26 and 26'. This eliminates the risk of the spacer grids of the fuel assemblies catching.

FIG. 5 represents an alternative embodiment for a displacement limiter for a fuel rod 30 inside a peripheral cell 31 of the spacer grid, defined by a part of the belt 32 of the spacer grid and straps, such as the strap 33 constituting that wall of the cell 31 which is arranged opposite the belt 32.

The strap 33 is penetrated by openings 34 and 34' making it possible to mount a spring 35 including a curved active part which projects into the cell 31 and on which the fuel rod 30 bears.

The strap 33 is furthermore cut and pushed in to form a stop 36 having a bearing part, parallel to the surface of the strap 33, the distance of which from the strap 33 is less than the deflection of the curved active part of the spring 35. When the spring 35 is put in place on the strap 33, the stop 36 is housed inside the concavity of the curved active part of the spring 35.

Level with the cell 31, the belt 32 includes two bearing dimples 37 and 37' which are produced by pushing in the metal of the belt and which are located opposite the active part of the spring 35.

When it is introduced into the cell 31, the fuel rod 30 is brought to bear by the spring 35 against the stops 37 and 37'.

If a force is exerted on the fuel rod 30 in the transverse direction (arrow 38), for example during impact or catching of the fuel assembly when it is being handled, the fuel rod 30 may be displaced in the transverse direction inside the cell 31, in the direction of the spacer grid. The active part of the spring 35 is compressed and the fuel rod 30 is no longer in contact with the dimples 37 and 37', as represented in FIG. 5. This transverse displacement of the fuel rod 30 is limited by the stop 36 since the concave inner face of the active part of the spring 35 comes into contact with the stop 36 after a certain displacement of the fuel rod 30.

Figure 6:
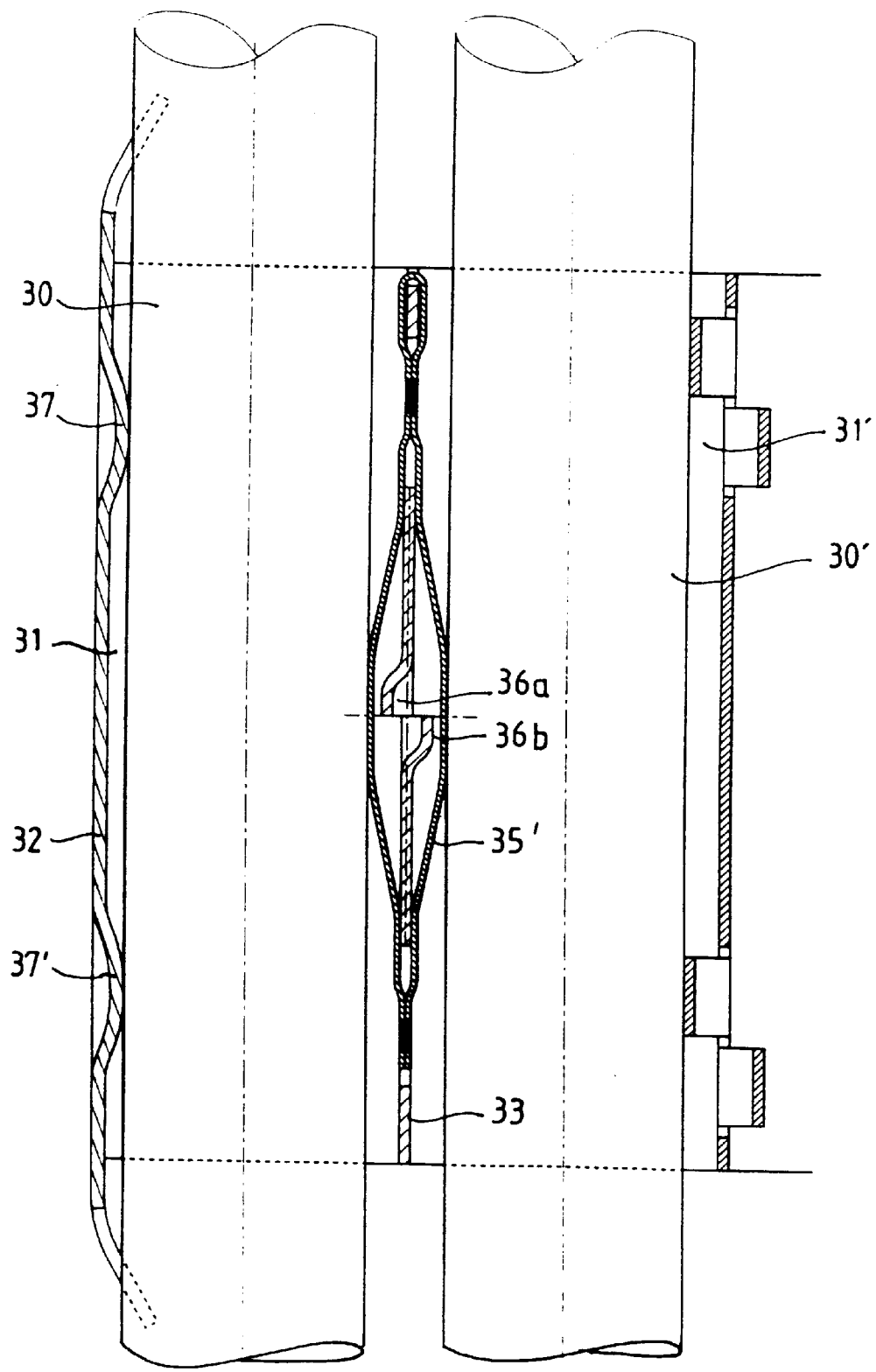
FIG. 6 is a view in section through a vertical plane of a peripheral cell and of an internal cell of a spacer grid according to a second embodiment of the invention.

FIG. 6 represents an alternative embodiment of a double spring mounted on a grid strap located opposite the belt of the grid, and of the stop for limiting the deflection of the spring, machined in the strap on which the spring is mounted.

The corresponding elements in FIGS. 5 and 6 have the same references.

The belt 32 of the grid includes bearing stops 37 and 37' for a peripheral rod 30 which is held against the stops 37 and 37', inside the peripheral cell 31, by means of a spring 35' mounted on the grid strap 33 arranged opposite the belt 32 and constituting a part of a wall of the cell 31.

In contrast to the spring 35 represented in FIG. 5, which included convex parts coming to bear on the fuel rods, the bearing spring 35' represented in FIG. 6 includes two plane bearing parts coming into contact with two rods 30 and 30' arranged in adjacent cells 31 and 31', over two regions of a certain length which are arranged along a generatrix of the rods 30 and 30'. The contact area between the spring 35' and the rods 30 and 30' is thus increased, which improves the transfer of forces between the spring and the rods.

The stresses in the various parts of the spring are also reduced and the stress corrosion of the alloys of the springs, which are age-hardened alloys, is limited.

A bearing stop is produced in two parts 36a and 36b for the two branches of the spring, in the part of the strap 33 located level with the branches of the spring 35'.

The two parts 36a and 36b of the bearing stop for the spring 35', which have a height which is less than the deflection of the leaves of the spring 35', have a substantially hemispherical shape and a flattened bearing surface.

As can be seen in FIG. 6, the stops in two parts 36a and 36b can limit the flexing of the spring and the displacement of a fuel rod, both in a peripheral cell, such as the peripheral cell 31, and in an internal cell, such as the cell 31'. It is, of course, possible to limit the flexing of the springs and the displacement of the fuel rods only in the corner cells of the structural spacer grids, in all the peripheral cells of the spacer grids, or alternatively also in all or some of the internal cells of the spacer grid.

The means for limiting the displacement of the fuel rods and the flexing of the springs may be of the type represented in FIGS. 3 and 4, or alternatively of the type represented in FIGS. 5 and 6.

FIG. 2 very schematically represents means for limiting the displacement of the fuel rods, these means being in the form of dimples 36, 36a or 36b arranged level with the springs, in the peripheral cells, such as the cells 6 of the spacer grid 1 represented in the figure, or alternatively an internal cell, such as the cell 5, or finally a corner cell, such as the cell 6a.

If anti-displacement means are used inside a cell, such as the corner cell 6a, these anti-displacement means 36, consisting for example of dimples placed level with the springs, must be provided for each of the springs 35 projecting in the corner cell 6a which are arranged on a cell wall facing the belt 4 bounding the cell 6a on two consecutive sides.

In general, anti-displacement means may be provided only in the corner cells of the spacer grid, in all the peripheral cells or alternatively in all or some of the internal cells of the grid.

If use is made of a spring which includes flat parts for bearing on the fuel rods, such as the spring 35' represented in FIG. 6, then this limits the stresses in the regions of the spring which are stressed if forces are exerted on the fuel rod bearing on the spring, as well as the tensile stresses inside the spring.

Figure 7:
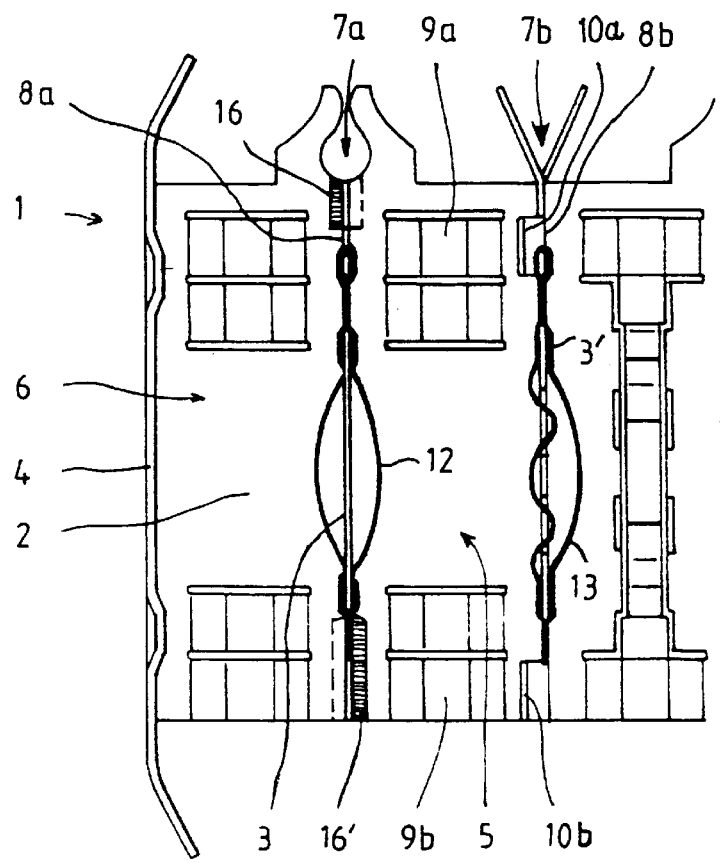
FIG. 7 is a view in section along 7—7 in FIG. 2.

As can be seen in FIGS. 2 and 7, the straps such as 2, 2' and 3, 3' are assembled together at a right angle. The cell, such as 5, of parallelepipedal shape with square base includes four mutually parallel corner edges along which the straps 2, 2' and 3, 3' are assembled in order to form four cross-braces 7a, 7b, 7c and 7d.

The cross-brace 7a consists of the straps 2 and 3 assembled together along a first longitudinal corner edge 8a of the cell 5, and the straps 2' and 3' are assembled along the corner edge 8b in order to form the cross-brace 7b.

The straps, such as the strap 2, include, along the assembly corner edges 8a and 8b, and over half their width, an assembly slot intended to receive the corresponding strap 3 or 3' which itself includes an assembly slot over half of its length, so that the straps such as 2, 2', 3 and 3' interlock in order to assemble at a right angle.

As will be explained further on, the straps are welded along a joining line arranged along a corner edge such as 8a and 8b.

The straps are also welded at each of their ends onto an outer plate of the belt 4 of the spacer grid represented in FIGS. 2 and 3.

In order to assemble the spacer grid, the straps such as 2, 2', 3, 3' are assembled together by interlocking at their corresponding assembly slots, and the belt 4 of the spacer grid is put in place around the preassembled spacer grid.

Cross-braces on the top of the grid are spot welded beforehand in order to join the straps together before welding.

The straps, such as 2, 2' and 3, 3', are welded together along corner edges such as 8a and 8b, and the ends of the straps are welded on to the belt 4. Prior to the welding, the straps and the belt are assembled together by assembly means of the tenon and mortice type.

It is possible to weld together the straps along the corner edges of the cross-braces and to weld the ends of the straps on to the belt by using a laser or electron-beam welding torch.

For each of the cross-braces, the welding is carried out in the bisector planes of the four dihedra of the cross-brace.

The welding of the cross-brace 7a consisting of the straps 2 and 3 assembled at a right angle will now be described.

The welding is carried out along the corner edge 8a and is firstly performed in the vicinity of the upper face of the spacer grid 1 and in a first diametral plane of two dihedra of the cross-brace 7a, as indicated by the arrows 14 and 14' giving the direction of the laser rays during the welding.

This produces, on either side of the corner edge 8a, in the first diametral plane of the two dihedra external to the cell 5, a first welding line 16 which can be seen in FIG. 7, over a part of the length of the corner edge 8a, in the end part of the corner edge, in the vicinity of the upper face of the spacer grid 1.

The weld line 16 may extend over a varying length of the corner edge 8a, starting from the upper face of the spacer grid.

In addition, plates 2 and 3 are welded, along the corner edge 8a, in a second diametral plane common to the two dihedra of the cross-brace 7a including the dihedron internal to the cell 5, as represented by the broken arrows 15 and 15' in FIG. 2. The welding in the second diametral plane represented by the directions 15 and 15' of the welding laser rays is carried out along the corner edge 8a, in the vicinity of the lower part of the spacer ogrid 1. This produces a weld line 16' (which can be seen in FIG. 7) extending from the lower face of the spacer grid over a certain length along the corner edge 8a.

The alternate top and bottom welding in the diametral planes of the two opposite dihedra of the cross-brace such as 7a makes it possible to limit the heating and the deformation of the straps while producing strong and rigid fastening of the straps, ensuring that the cells have a very precise geometric shape.

Furthermore, in a cell such as the cell 5, the successive cross-braces 7a, 7b, 7c and 7d are welded in such a way that, in each of the top and bottom parts of the corner edges joining the adjacent to cross-braces, the welds are made along mutually perpendicular bisector planes.

Thus, the cross-braces 7b and 7d adjacent to the cross-brace 7a are welded, in the top part of the spacer grid, along two bisector planes of two dihedra, external to the cell 5, which are perpendicular to the plane along which the weld 16 is made, this plane being defined by the directions 14 and 14' in FIG. 2. The welding directions at the upper part of the grid are represented in solid lines.

Similarly, the bottom part of the weld lines of the cross-braces 7b and 7d adjacent to the cross-brace 7a is produced along the direction of a bisector plane perpendicular to the bisector plane along which the weld line of the bottom part of the cross-brace 7a is made. The weld lines of the bottom part of the grid are represented in broken lines.

In general, in FIG. 2 the directions defining the bisector planes in which the welding is carried out at the upper part of the spacer grid, such as the directions 14 and 14', are represented in solid lines whereas the directions defining the bisector planes along which the welding is carried out at the lower part of the spacer grid, such as the directions 15 and 15', are represented in broken lines.

Thus, FIG. 2 shows the arrangement and distribution of the bisector planes in which the welding is carried out at the upper part and at the lower part of the spacer grid.

This produces a weld and a thermal stress distribution which are perfectly symmetrical on each of the straps constituting the grid, so that the deformations of the spacer grid due to welding are minimal.

Of course, it is possible firstly to make all the upper welds of the spacer grid, in the bisector planes having alternate positions for the adjacent to cross-braces of the grid, then secondly to make all the weld lines adjacent to the lower face of the spacer plate. The designation of the two faces of the spacer plate as upper face and lower face is given only for clarity of the description, it being possible for the spacer plate to be inverted, between two welding operations, in order to be moved under the welding head.

FIG. 8 shows a strap 18 of a spacer grid according to the invention, including, along two transverse lines 18a and 18b along which the straps are assembled at a right angle, two assembly slots 19a and 19b which pass through the entire thickness of the strap and extend approximately over one half of the width of the strap, between one of the edges of the strap and its central part.

Two holding and fastening means 20a, 20'a and 20b, 20'b are placed along the corner edges 18a and 18b, in extension of the slots 19a and 19b, and these means are used for temporarily fastening two straps perpendicular to the strap 18 along the corner-edge lines 18a and 18b, before the welding operation, as well as for reinforcing the joining of the straps fixed by welding on to the strap 18, along the corner-edge lines 18a and 18b.

The fastening means 20a, 20'a and 20b, 20'b are in the form of clefts which can be pushed in on either side of two apertures passing through the strap, so as to project relative to each of the faces of the strap.

During the preassembly, the two straps which are assembled with the strap 18 along the lines 18a and 18b are engaged between the projecting parts of the fastening means 20a, 20'a, 20b, 20'b, which holds them. The clefts 20a, 20'a, 20b, 20'b not only contribute to the temporary holding of the straps of the grid before welding, but also to taking up the transverse forces on the straps, when the grid is in service, which commensurately reduces the pressures exerted on the welds.

In order to rigidify the cross-braces further and to increase the crush resistance of the spacer grid, two sets of tongues 21a and 21b are provided along each of the assembly corner edges 18a and 18b, between the corresponding assembly slot 19a or 19b and the fastening assembly 20a, 20'a or 20b, 20'b, each of these sets including four tongues cut from the thickness of the strap, arranged opposite in pairs on either side of the assembly corner edges 18a and 18b and pushed in so as to project on either side of the faces of the strap 18.

Depending on the space available on the strap, it is possible to provide a single pair of tongues in opposite arrangements on either side of the corner edge 18a or 18b in addition to two pairs of clefts.

FIGS. 9 and 10 represent a portion of a strap 40 of a spacer grid according to the invention, in a region 41 constituting a wall of a cell which receives a guide tube of the fuel assembly.

In the region 41, the metal of the strap 40 is pushed in so as to project slightly on the side of the cell which is to receive the guide tube. The pushed-in part of the wall is shaped to form a concave cylindrical surface 42 which receives the guide tube.

The cylindrical surface 42 may have a large diameter which is virtually equal to the side length of the cell into which the guide tube is housed. In this way, it is possible to place a guide tube of larger diameter in the cell of the spacer grid. Using larger-diameter guide tubes makes it possible to obtain an extremely rigid and strong fuel assembly framework.

The strap 40 is cut and pushed in in the region in which the cylindrical surface 42 has been produced, in order to form two dimples 43 and 43' with a width which is less than the width of the cylindrical surface 42 for receiving the guide tube, which project into a cell adjacent to the cell receiving the guide tube. The dimples 43 and 43' constitute bearing stops for a fuel rod housed in the cell adjacent to the cell receiving the guide tube.

FIGS. 11 and 12 represent an alternative variant of a wall 40' of a spacer grid according to the invention, in a region 41' in which the strap 40' constitutes a partition wall between a cell intended to receive a large-diameter guide tube and an adjacent cell intended to receive a fuel rod.

The wall 40' is pushed in in the direction of the cell intended to receive a fuel rod, so as to form a concave cylindrical surface 42', the diameter of which may be slightly greater than the side length of the cell of the spacer grid intended to receive a guide tube.

The strap 40' is pushed in in the direction of the cell intended to receive the fuel rod, so as to form a dimple 43', in the shape of a hemispherical cap, including a flattened central part 43'a intended to come into contact with a fuel rod.

The embodiment represented in FIGS. 11 and 12 makes it possible both to have a large-diameter guide tube in a cell of the spacer grid and to obtain dimples such as 43' which are very rigid.

Figure 13:
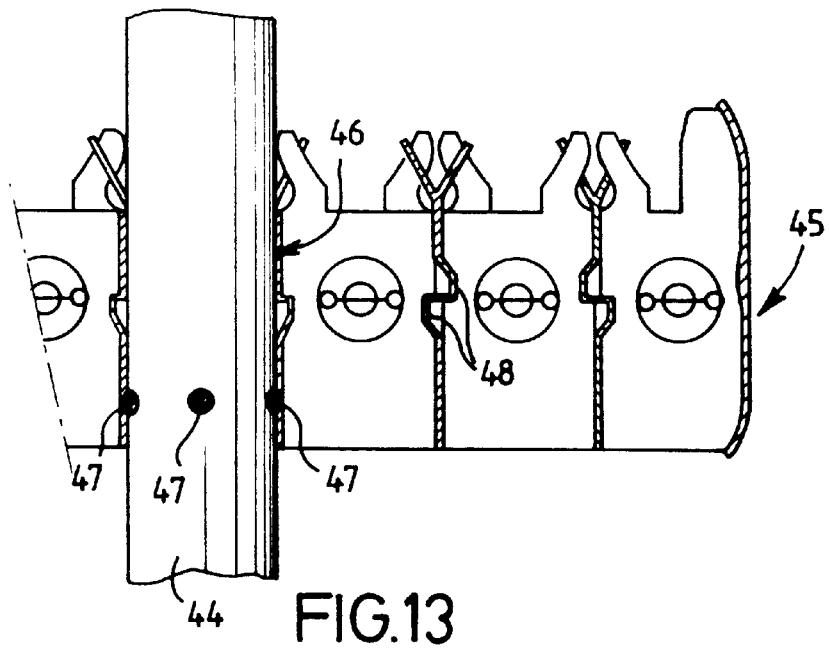
FIG. 13 is a view in axial section of a part of a spacer grid according to the invention and of a guide tube fixed in a cell of the spacer grid.

FIG. 13 represents a guide tube 44 which is introduced into a cell of a spacer grid 45 according to the invention, including means for receiving the guide tube which are in the form of cylindrical surfaces, such as the surface 42' represented in FIGS. 11 and 12.

The four walls defining the cell 46 in which the tube 44 is arranged each include a cylindrical reception surface. The four surfaces for receiving the guide tube 44 have a common axis which is the axis of the cell 46 along which the axis of the guide tube 44 is placed.

The guide tube 44 is fastened by spot welds 47 made through the wall of these straps defining the cell 46, in that region of these straps which includes the surface for receiving the guide tube 44.

The cells adjacent to the cell 46 include dimples 48, in the form of hemispherical caps, produced by pushing-in and projecting into the cell and an adjacent cell which also receives a fuel rod.

This produces an extremely rigid and strong support structure for a fuel assembly.

The welding of the guide tubes may also take place on a tongue projecting at the upper or lower end of a strap, such as the tongue 49 represented in FIG. 9.

The straps and the belt constituting the structure of the spacer grid include, along their edges corresponding to the upper face of the spacer grid in place in a fuel assembly, vanes for mixing the cooling fluid which comes into contact with the fuel rods of the assembly.

Figure 14:
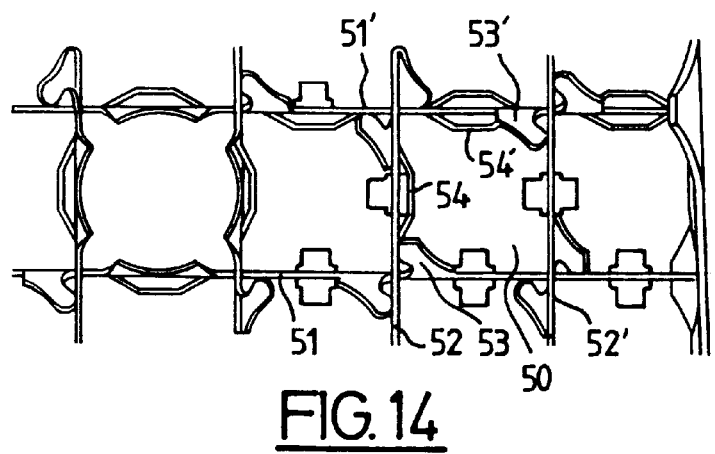
FIG. 14 is a plan view of a part of a spacer grid according to the prior art.
Figure 15:
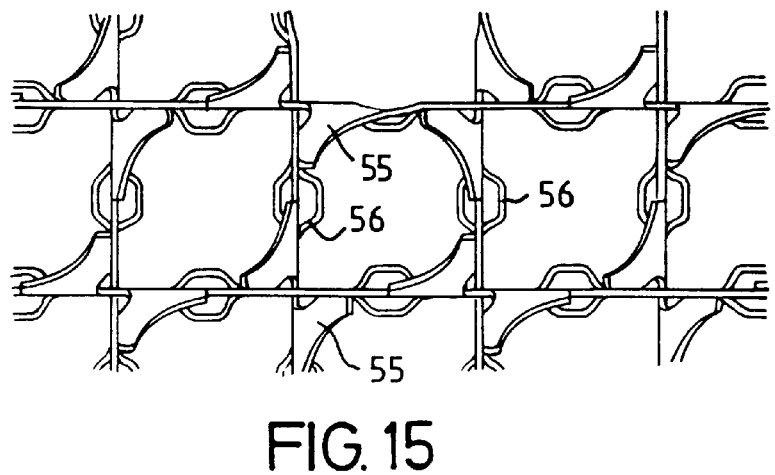
FIG. 15 is a plan view of a spacer grid according to the invention, including large mixing vanes and small dimples.

FIGS. 14 and 15 respectively represent the upper face of a spacer grid according to the prior art and according to the invention. The mixing vanes and the fuel-rod bearing dimples in the cells of the spacer grid have been modified in the case of the assembly according to the invention.

FIG. 14 represents a plurality of adjacent cells of a spacer grid, one of these cells being intended to receive a guide tube and the other cells being intended to receive fuel rods.

The cell 50 intended to receive a fuel rod is defined by four interlaced straps 51, 51', 52 and 52' which are parallel in pairs and assembled to form right-angled cross-braces.

On its upper edge, each of the straps 51, 51', 52 and 52' includes, in a part constituting a wall of the cell 50, a cooling-fluid mixing and guide vane.

A vane 53 secured to the upper edge of the strap 51, and a vane 53' secured to the upper edge of the strap 51', are folded into the cell 50 in order to guide the cooling fluid at the exit of the cell 50.

The bearing dimples for a fuel rod, which project into the cell 50, are produced by cutting and pushing in the straps 52 and 51', in their part which constitutes the walls of the cell 50. Two dimples, such as 54, are formed on the strap 52, and two other dimples, such as 54' are formed on that part of the strap 51' which constitutes the wall of the cell 50.

Springs are arranged opposite the sets of dimples 54 and 54', on the straps 52' and 51'.

When the spacer grid is mounted by assembling the straps such as 51, 51', 52 and 52', it is necessary to engage corresponding slots of the straps into one another and to slide the straps relative to one another until they are completely engaged, so as to produce a cross-brace.

It is necessary to produce the guide vanes and the dimples in such a way that the straps can be assembled by sliding on one another.

For example, because the vane 53 on the upper edge of the strap 51 is directed towards the stop 54 formed on the strap 52, it is necessary to provide a sufficiently short vane 53 so that it does not encroach on the cross-section of the stop 54, in order to make it possible to assemble the two straps.

The vanes, such as 53, formed on a strap must therefore be sufficiently short, so as not to extend over the space occupied by the bearing dimples of the strap located adjacent at a right angle.

FIG. 15 represents vanes and dimples of a spacer grid according to the invention.

In the case of a spacer grid according to the invention, the vanes 55 are much larger than the vanes 53 and 53' of the embodiment according to the prior art represented in FIG. 13, and the dimples 56 are smaller, so as to avoid interference of the vanes and the dimples when the spacer grid is mounted.

In the embodiment represented in FIG. 15, use may be made of dimples 56 having the shape of spherical-cap portions and including a substantially plane bearing surface projecting into a cell of the spacer grid.

The belt of the spacer grids also includes mixing vanes secured to its upper edge.

Figure 16:
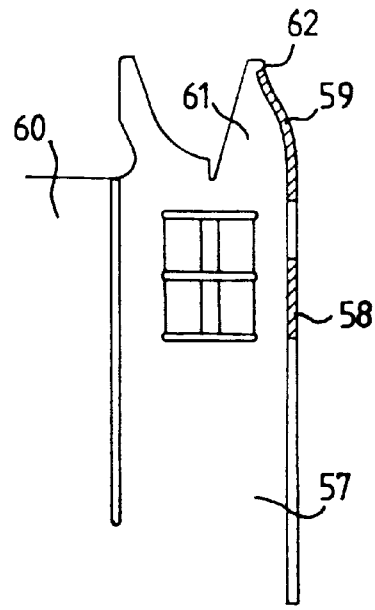
FIG. 16 is a view in longitudinal section of a peripheral cell of a spacer grid according to the invention.

FIG. 16 represents a peripheral cell 57 of a spacer grid, one of the walls of which consists of a part of the belt 58 of the spacer grid.

The belt 58 of the spacer grid includes, along its upper edge, a guide vane 59 which is folded into the cell 57.

The belt 58 is assembled by welding with a strap 60 constituting a side wall of the cell 57 arranged adjacent and at a right angle relative to that part of the belt 58 which constitutes the outer wall of the cell 57.

The strap 60 includes, along its upper edge, a projecting part 61 along which the guide vane 59 of the belt 58 will be folded down, level with the cell 57.

In order to make the guide vanes such as 59 more rigid and solid, a welded join may be made between the guide vane 59 and the projecting part 61. This welded join may be made in the form of a spot weld 62 joining the end of the vane 59 and the adjacent projecting part 61. This welded join could also be made along those edges of the inwardly folded vane 59 and of the adjacent projecting part 61 which are in contact.

The known spacer grids of the prior art, which are fitted with attached springs, generally include a large number of double springs, i.e., springs which include two active parts located in two adjacent cells, on either side of the wall on to which the spring is fixed. Using double springs has the drawback that the deformation of one active part of the spring leads to an induced deformation of the second active part of the spring.

The use of double springs does not always make it possible to obtain a perfectly regular lattice of the fuel rods and therefore spaces, for the water to pass around the rods, with perfectly identical cross-sections.

Figure 17:
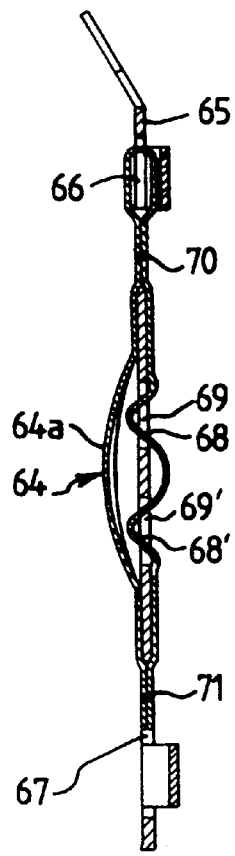
FIG. 17 is a view in longitudinal section of a strap of a spacer grid on which a single spring is fixed, according to an alternative embodiment of the invention.

In order to avoid these drawbacks, the spacer grid according to the invention may, in some cases, include only single springs, which are mounted and fastened on the straps of the grid as represented in FIG. 17.

The strap 65 of the grid on which the single spring 64 is mounted includes two through-openings 66 and 67 in which the single spring 64 is engaged and fixed.

The spring 64 is in the shape of a staple including two branches, one of which includes the curved or flattened active part of the spring 64a and the other of which includes two dimples 68 and 68' for positioning the spring inside the respective windows 69 and 69' penetrating the strap 65.

The window 66 of the strap 65 makes it possible to house the upper part of the spring 64 which includes the folded part of the hairpin and, for each of the branches, a plane upper part. The two plane upper parts of the branches of the spring 64 are fixed onto one another by a spot weld 70, after the spring 64 has been engaged on the strap 65.

The spring 64 also includes, on each of its branches, two lower plane parts which are fixed to one another by a spot weld 71 inside the lower window 67.

The single spring may include a flat active branch instead of the convex curved branch 64a.

Figure 19:
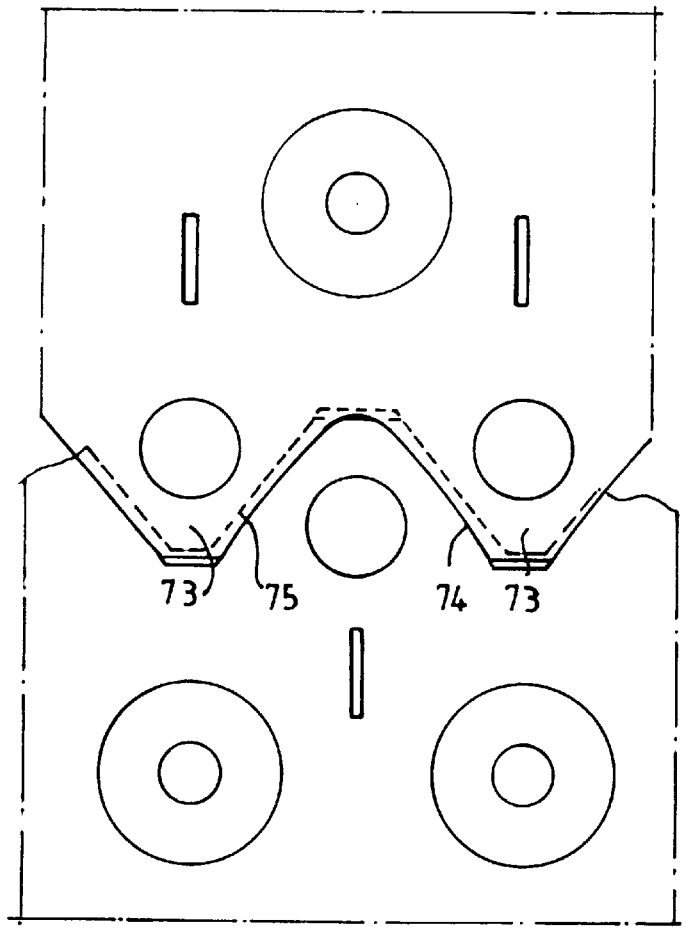
FIG. 19 is a view in the direction of arrow 19 in FIG. 18.
Figure 18:
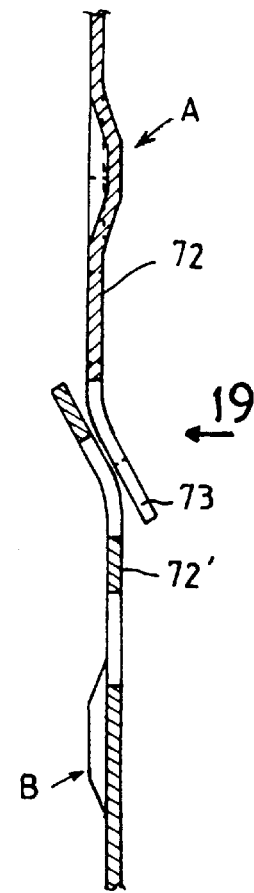
FIG. 18 is a view in elevation and in section of the lower part of the belt of a spacer grid of a first fuel assembly, and of the upper part of the belt of a spacer grid of a second fuel assembly, in a position in which they approach each other during the handling of fuel assemblies including spacer grids according to the invention.

FIGS. 18 and 19 represent a part of a belt 72 of a first fuel assembly A, including the lower edge of the belt and a part of a belt 72' of a second fuel assembly B, including the upper edge of the belt. The belts of the first and second assemblies are represented in an abutting position, during the handling of one of the two fuel assemblies. In this position, the lower part of the belt 72, including the guide vanes 73 separated by cutouts 74, comes opposite the upper part of the belt 72', including the guide vanes such as 75 represented as a broken line in FIG. 18. In the case of an assembly according to the invention, any vane 75 cut from the upper edge of a belt of a spacer grid has larger dimensions than a cutout 74 between two vanes 73 of the lower edge of the spacer grid. In this way, when the belts of the two assemblies abut during a handling operation, the vane 75 comes to bear by its edges on two adjacent vanes 73 of the belt of a spacer grid. This avoids any risk of catching between the spacer grids of the fuel assemblies.

In the case of assemblies according to the prior art, the vanes and the cutouts have substantially identical dimensions, so that the vanes can be engaged in the cutouts during the handling of fuel assemblies, which produces catching.

Figures 20, 21:
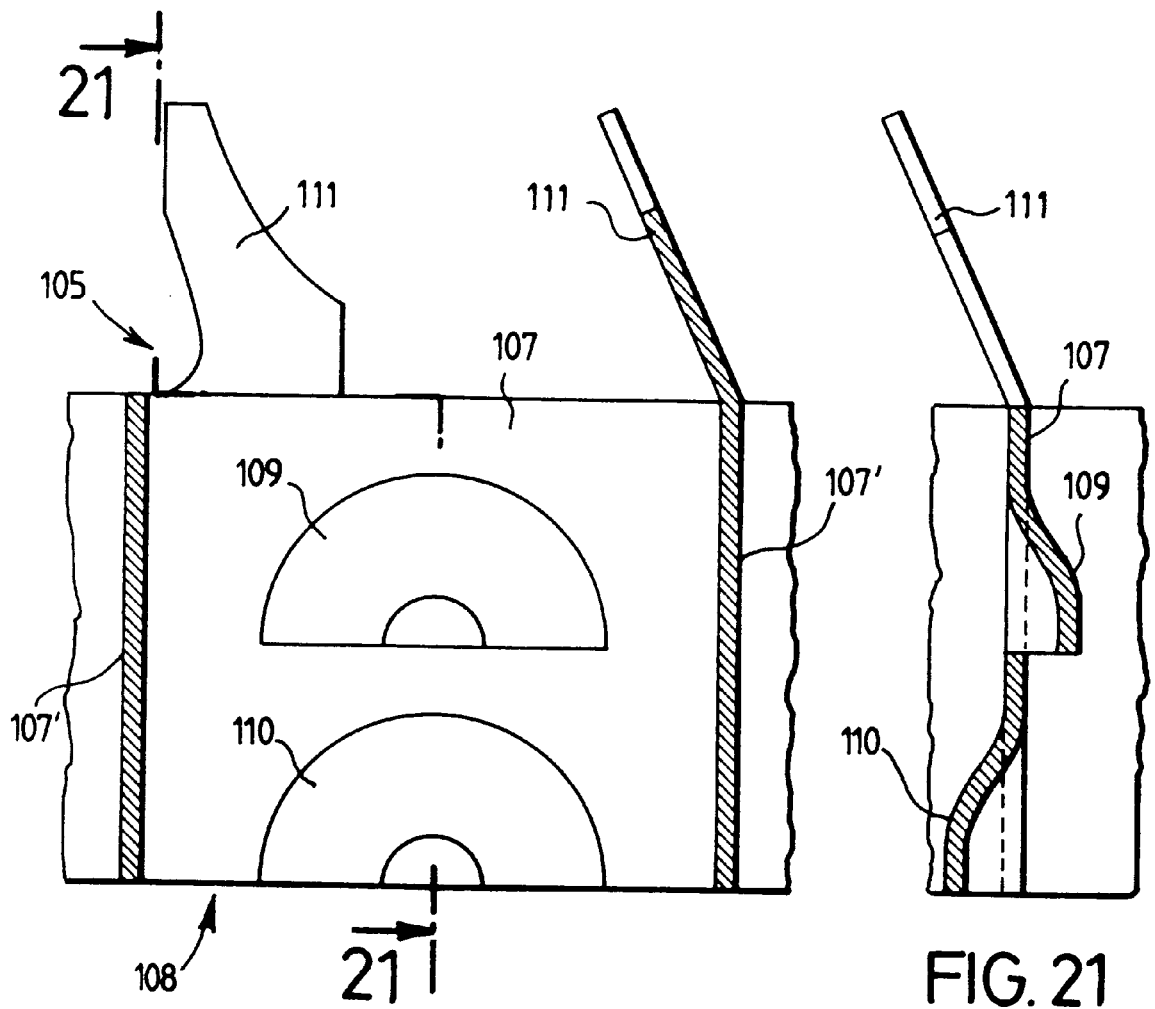
FIG. 20 is a sectional view of a cell of a stirring grid of an assembly according to the invention, showing a wall fitted with dimples in two parts.
FIG. 21 is a view in section along 21—21 in FIG. 20.

FIGS. 20 and 21 represent a cell of an additional mixing grid interposed between two structural grids such as the grid 105 represented in FIG. 1.

FIGS. 20 and 21 correspond to FIGS. 3 and 4 of EP-A-0,468,871, the grid 105 being produced according to the teachings of this European patent.

In the context of the present invention, the grids, such as the grids 105, including means for mixing the coolant, will be used as additional mixing grids.

The additional grid 105 consists of two sets of interlaced straps 107, 107' arranged at a right angle to form cells, such as the cell 108 intended to receive a fuel rod. The upper edges of the straps are cut so as to form mixing vanes 111 intended to create turbulence and transverse flows on the flow of the nuclear reactor coolant. The mixing vanes 111 each extend level with a single cell and are each folded into a cell.

On their four faces, the internal cells of the grid which are intended to receive a fuel rod and are adjacent to cells which also receive a fuel rod, such as the cell 108, include stop means projecting into the cell which defines a passage of larger dimension than a rod. On each face (such as the strap 107) separating two cells such as 108 which each receive a fuel rod, the stop means consist of two portions 109 and 110 in the form of cut and dished scoops; the two portions 109 and 110 have a convex face, in the form of a half-button whose base is approximately semicircular, and are aligned relative to one another in the direction of flow of the reactor coolant. The scoop-shaped wall portions 109 and 110 make it possible both to limit the displacement of the rods, so as to avoid contact of the rods with the mixing vanes, and to pass the coolant from one cell to an adjacent cell.

When the fuel rods are held inside the cells of the mixing grids 105 by dimples in the shape of a spherical cap, or such as are represented in FIGS. 20 and 21, it is necessary to provide a slight radial clearance between the fuel rods and the holding dimples, in order to make it possible to engage the fuel rods in the grids when mounting or reloading the assembly. As a result, the rods may vibrate inside the cells of the mixing grids, in the operating reactor.

Figure 22:
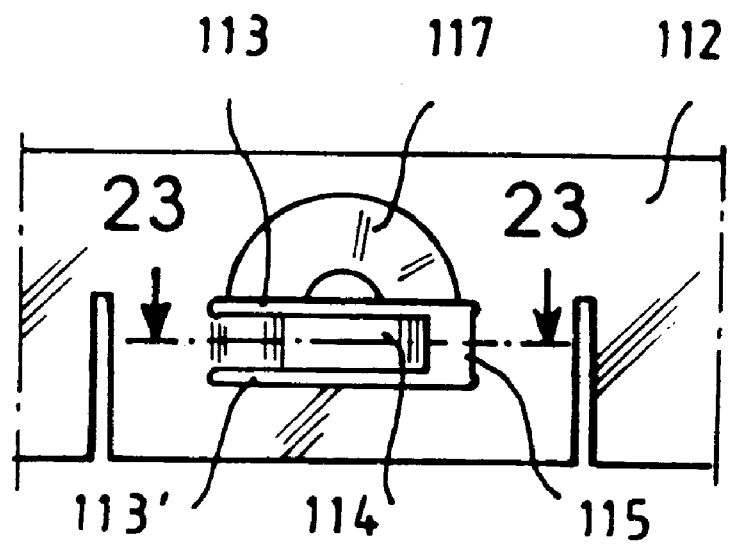
FIG. 22 is a front elevation view of a wall of an additional mixing grid of a fuel assembly according to the invention.
Figure 23:
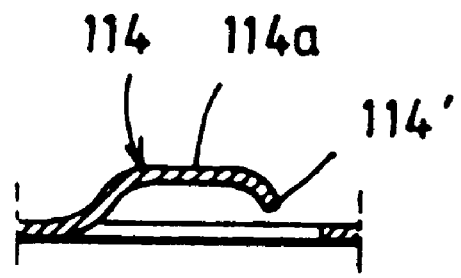
FIG. 23 is a view in section along 23—23 in FIG. 22.

As represented in FIGS. 22 and 23, the walls 112 of the cells of the mixing grids 105 of the assembly, which are located opposite walls including rigid dimples, may advantageously include elastic dimples 111 produced by cutting the wall 112 to produce two mutually parallel slots 113, and 113' and by pushing in the metal of the wall between the two slots 113 and 113' to produce a projecting part having the shape of a bridge.

Because of the reduced width of the region of the wall 112 located between the slots 113 and 113', the "bridge" dimple has a high degree of elasticity. Two elastic "bridge" dimples are generally provided on the wall 112 of the cell, one in the vicinity of the upper part and the other in the vicinity of the lower part of the grid, opposite two rigid dimples located on an opposite wall of the cell. A space is provided between the "bridge" dimples and the rigid dimples, which is slightly less than the diameter of a fuel rod, so that a fuel rod introduced into a cell of the mixing grid and pressed by the "bridge" dimples against the rigid dimples is immobilized and is therefore not subjected to the vibrations due to the passage of the cooling fluid. This overcomes the effect due to the absence of holding springs on the mixing grids.

As represented in FIGS. 22 and 23, the "bridge" dimple may include a cut 115, so that the end 144' of the dimple is detached from the wall 112 from which it is cut.

This increases the elasticity of the "bridge" dimple 114. The central part 114a of the "bridge" dimple 114 may advantageously be flattened so as to come into contact with the fuel rod in a region of larger area.

The wall 112 is also pushed in above (or below) the elastic dimple 114, on the side opposite the dimple 114, so as to form a rigid dimple 117 in a cell adjacent to the cell in which the elastic dimple 114 projects.

The fuel assemblies according to the invention, including optimized spacer grids, have an increased lifetime, with a high burnup fraction, without risk as regards the safety of the nuclear reactor.

Furthermore, the spacer grids according to the invention can be produced more simply with a superior geometrical and dimensional production quality.

The spacer grids according to the invention are also stronger during handling of the fuel assembly.

The straps of the spacer grid which are produced by cutting and pushing in may have a form other than those which have been described. The attached springs may also be different from the forms described and represented.

The straps of the spacer grid may be welded in end regions, of the corner edges of the cross-braces, which are of varying length.

The fuel assemblies according to the invention, including several types of grids, may include only holding grids and structural grids, to the exclusion of mixing grids.

The invention is applicable both to fuel assemblies which include only structural spacer grids according to the invention and to these which include such structural spacer grids and grids of a different type, for example additional stirring grids and fuel-rod holding grids.

Finally, the invention is applicable not only to fuel assemblies having grids defining a lattice with square repeat units, with an arbitrary number of cells, but also to those which have grids defining a lattice with a different shape.

I claim:

1. A spacer grid of a fuel assembly for a nuclear reactor, consisting of interlaced metal straps defining a regular lattice of prismatically shaped cells, a part of which includes, in each cell, at least one spring for holding a fuel rod intended to be housed in the cell, the spring being added and arranged on a cell wall consisting of a part of a metal strap and having an active part projecting into the cell relative to the wall, wherein, for at least some of the cells of the spacer grid, at least one plane wall on which a spring is fixed includes at least one stop projecting into the cell so as to limit displacement of a fuel rod housed in the cell, the stop having a substantially plane part parallel to that wall of the cell on which the spring is fixed.

2. The spacer grid according to claim 1, wherein the stop is obtained by cutting and pushing in the wall of the cell.

3. The spacer grid according to claim 1, of polygonal shape having corner cells arranged in each corner of the grid including two successive walls consisting of angularly arranged parts of a peripheral belt of the grid, and two walls opposite the belt, each bearing a spring, wherein each of the walls placed opposite the belt includes at least one stop projecting into the cell, and only said corner cells include stops for limiting the displacement of a fuel rod housed in a corner cell.

4. The spacer grid according to claim 1, comprising a set of peripheral cells each including at least one outer wall consisting of a part of a peripheral belt of the grid and an inner wall opposite the belt, wherein the inner wall of each of the peripheral cells located opposite the belt includes at least one stop projecting into the cell, and only the peripheral cells of the spacer grid include stops for limiting the displacement of the fuel rods arranged in the peripheral cells.

5. The spacer grid according to claim 2, wherein the strap on which the spring is arranged is cut and pushed in, in two regions constituting stops on either side of each of the ends of the spring, the bearing faces of the stops being at a distance from the inner face of the wall of the peripheral cell which is less than the deflection of an active part of the spring.

6. The spacer grid according to claim 2, wherein the wall on which the spring is arranged is cut and pushed in to constitute a stop having a bearing face, in a region located between an active part of the spring and the wall of the cell on which the spring is arranged.

7. The spacer grid according to claim 6, wherein the wall on which the spring is arranged is cut and pushed in to constitute two stops in the form of flattened hemispherical caps, projecting in two adjacent cells separated by the strap, in regions which are each located between an active part of the spring and the wall of the cells.

8. The spacer grid according to claim 1, wherein the spring includes a plane region for bearing on an active part of a fuel rod which projects into the cell of the grid.

9. The spacer grid according to claim 1, including a set of cells, each intended to receive a guide tube of the fuel assembly, wherein those cells of the spacer grid which are intended to receive a guide tube include, on each of their walls which consist of a part of a strap, a region which is pushed in relative to the wall consisting of the strap, having a concave cylindrical surface directed into the cell receiving the guide tube.

10. The spacer grid according to claim 9, wherein that wall of the cell which consists of a strap is pushed into the cell which receives the guide tube so as to constitute the cylindrical surface and, in an opposite direction, into a cell adjacent to the cell intended to receive the guide tube, so as to constitute a dimple for bearing on a fuel rod opposite a part of the cylindrical surface.

11. The spacer grid according to claim 9, wherein that wall of the cell which consists of a strap is pushed out of the cell intended to receive the guide tube so as to constitute the cylindrical surface and includes a dimple for bearing on a fuel rod, in the shape of a spherical cap portion projecting into a cell adjacent to the cell intended to receive a guide tube.

12. The spacer grid according to claim 9, wherein, in each of the cells intended to receive a guide tube, the guide tube is fixed by spot welds onto the straps constituting the walls of the cell, in cylindrically shaped pushed-in regions or on a projecting part of the strap in the upper or lower part of the spacer grid.

13. The spacer grid according to claim 1, having straps which include, level with each of the cells of the grid and along one of their longitudinal edges of such cells, a vane for mixing the cooling fluid of the fuel assembly, folded down into the cell, wherein the mixing vanes folded down into the cell are made in such a way that they are not superposed in a longitudinal direction of the cell with bearing dimples, projecting into the cell.

14. The spacer grid according to claim 13, wherein the bearing dimples are smaller than the mixing vanes.

15. The spacer grid according to claim 1, including a peripheral belt having, on at least one of its edges, fuel assembly guide vanes adjacent to a strap of the spacer grid, wherein the strap includes a part which projects relative to one of its edges adjacent to the guide vane, and the guide vane is fixed by welding at its end onto the projecting part of the strap.

16. The spacer grid according to claim 1, including a belt having an upper edge and a lower edge with guide vanes folded into the spacer grid and separated by cut-outs in the edge of the belt, wherein the guide vanes of a first edge of the belt have larger dimensions than the cut-outs in a second edge of the belt.

17. The spacer grid according to claim 1, including at least one spring having an active part, inside each of the cells, for holding a fuel rod, wherein each of the springs of each of the cells of the spacer grid includes a single active part, projecting into a cell of the spacer grid.

18. The spacer grid according to claim 17, wherein each of the springs is fixed to a strap of the spacer grid which is pierced by two windows for engagement and welded to one another of two hairpin-shaped branches of the spring which overlap a part of the strap, and by two windows for engagement of two dimples of one branch of the spring which is opposite the branch of the spring including the active part.

19. The spacer grid according to claim 1, in which mutually parallel corner edges of the cells each consist of the intersection of two straps forming a cross-brace consisting of four dihedra having in common one corner edge common to four cells, wherein the straps are welded together in pairs at each of the corner edges along a first bisector plane of two opposite dihedra, in a first end region of the corner edge, and along a second bisector plane of the other two opposite dihedra, in a second end region, opposite the first, of the corner edge of the cross-brace.

20. The spacer grid according to claim 19, wherein, for each of the cells of the spacer grid, the straps constituting two second cross-braces adjacent to a first cross-brace are welded together along a plane parallel to the second bisector plane, in a first end region of their corner edge which is opposite the first end region of the corner edge of the first cross-brace, and along a plane parallel to the first bisector plane, in a second end region located opposite the second end region of the corner edge of the first cross-brace.

21. The spacer grid according to claim 19, wherein the straps of the spacer grids are welded together by one of laser-beam welding and electron-beam welding.

22. The spacer grid according to claim 19, the straps of which include, along the corner edges of the cross-braces which each consist of the combination of two straps, an engagement slot over a length corresponding essentially to half the width of the strap, and means for holding the straps constituting a cross-brace, in the form of clefts obtained by cutting and pushing in the metal of the strap, wherein each of the straps further includes, between the engagement slot and the holding means, sets of tongues cut and pushed out of the planes of the faces of the strap.

23. A fuel assembly for a nuclear reactor, including a framework consisting of mutually parallel guide tubes, spacer grids distributed over the length of the guide tubes, and end nozzles fixed to the end of the guide tubes, wherein at least some of the spacer grids of the assembly are spacer grids according to claim 1.

24. The fuel assembly according to claim 23, including end grids for axially holding the fuel rods of the assembly.

25. The fuel assembly according to claim 23, including additional mixing girds, each interposed between two spacer grids, or one spacer grid and one end grid of the fuel assembly constituting the upper part of the framework in the service position of the fuel assembly in the nuclear reactor.

26. The fuel assembly according to claim 25, wherein the additional mixing grids comprise at least two sets of interlaced straps defining cells which receive either a fuel rod or a guide tube and are fitted with stop means projecting into the cells intended to receive the fuel rods, the stop means including, on each wall separating two internal cells occupied by fuel rods, two portions of straps cut and deformed into the shape of scoops, offset in the direction of flow of the coolant of the reactor through the fuel assembly, the projections of which extend in opposite directions and are open on a single axial side in order to limit the displacement of the fuel rods and to tend to make the coolant flow from one cell to the other.

27. The fuel assembly according to claim 25, wherein the additional mixing grids include walls, delimiting the cells for the fuel rods, on which elastic dimples are produced by cutting and pushing in the metal of the wall, which are in the form of bridges arranged opposite rigid dimples provided on the opposite walls of the cells of the grid.

28. The fuel assembly according to claim 27, wherein the elastic dimples are detached from the wall at one of their ends by a cut.

29. The fuel assembly according to claim 27, wherein the holding end grids are entirely made of martensitic steel and include springs formed in the metal of the holding spacer grid.

30. The fuel assembly according to claim 24, wherein an upper end grid of the fuel assembly is mounted so as to slide on the guide tubes.

* * * * *